United States Patent
Scheel

(10) Patent No.: US 10,452,820 B2
(45) Date of Patent: Oct. 22, 2019

(54) THREAD-BASED SOFTWARE LICENSE MANAGEMENT

(75) Inventor: Jeffrey Jay Scheel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1621 days.

(21) Appl. No.: 11/768,246

(22) Filed: Jun. 26, 2007

(65) Prior Publication Data

US 2009/0006257 A1    Jan. 1, 2009

(51) Int. Cl.
G06F 21/12    (2013.01)

(52) U.S. Cl.
CPC ................... G06F 21/126 (2013.01)

(58) Field of Classification Search
CPC ..................................... G06F 21/126
USPC .......................................... 705/59
See application file for complete search history.

(56) References Cited

U.S. PATENT DOCUMENTS

| | | | |
|---|---|---|---|
| 5,023,907 A | 6/1991 | Johnson et al. | |
| 5,579,222 A | 11/1996 | Bains et al. | |
| 5,826,081 A * | 10/1998 | Zolnowsky | 718/103 |
| 6,959,291 B1 | 10/2005 | Armstrong et al. | |
| 6,961,935 B2 * | 11/2005 | Torii | 718/100 |
| 7,047,337 B2 * | 5/2006 | Armstrong et al. | 710/200 |
| 7,096,469 B1 | 8/2006 | Kubala et al. | |
| 7,328,263 B1 * | 2/2008 | Sadjadi | 709/225 |
| 7,752,610 B2 * | 7/2010 | Cabillic | G06F 9/30174 |
| | | | 717/127 |
| 2001/0044705 A1 | 11/2001 | Vardi et al. | |
| 2002/0013915 A1 * | 1/2002 | Migita et al. | 714/6 |
| 2002/0128976 A1 | 9/2002 | O'Connor et al. | |
| 2002/0138764 A1 | 9/2002 | Jacobs et al. | |
| 2002/0161718 A1 | 10/2002 | Coley et al. | |
| 2003/0177074 A1 * | 9/2003 | Ramanathan | 705/26 |
| 2003/0220883 A1 | 11/2003 | Block et al. | |
| 2004/0088176 A1 * | 5/2004 | Rajamani | 705/1 |
| 2004/0249756 A1 | 12/2004 | Garibay et al. | |
| 2004/0260589 A1 | 12/2004 | Varadarajan et al. | |
| 2004/0267590 A1 | 12/2004 | Clark et al. | |
| 2005/0071841 A1 * | 3/2005 | Hoflehner | G06F 8/441 |
| | | | 718/100 |
| 2005/0076334 A1 | 4/2005 | Demeyer | |
| 2005/0155034 A1 * | 7/2005 | Jiang | G06F 9/30087 |
| | | | 718/106 |
| 2005/0198637 A1 * | 9/2005 | Kogan | G06F 21/52 |
| | | | 718/100 |
| 2006/0053423 A1 * | 3/2006 | Jones et al. | 718/100 |

(Continued)

OTHER PUBLICATIONS

Nagar, Rajeev. Windows NT File System Internals: A Developer's Guide. Cambridge [Eng.] ; Sebastopol, Calif. O'Reilly and Associates, 1997.*

(Continued)

*Primary Examiner* — James M Detweiler
*Assistant Examiner* — Monica A Mandel
(74) *Attorney, Agent, or Firm* — Middleton Reutlinger

(57) ABSTRACT

An apparatus, program product and method of managing a software license on a computer on a thread-by-thread bases, e.g., within a scheduler and dispatcher. A software license resource is associated with an execution thread of a task or process. The execution thread is selectively dispatched for execution based upon a license provision defined by the software license resource.

27 Claims, 6 Drawing Sheets

(56) References Cited

U.S. PATENT DOCUMENTS

| | | | | |
|---|---|---|---|---|
| 2006/0100962 | A1 | 5/2006 | Wooldridge et al. | |
| 2007/0028240 | A1* | 2/2007 | Hayakawa | 718/100 |
| 2007/0061788 | A1* | 3/2007 | Dodge et al. | 717/140 |
| 2007/0136721 | A1* | 6/2007 | Dunshea | G06F 9/5077 717/174 |
| 2007/0288941 | A1* | 12/2007 | Dunshea et al. | 719/328 |
| 2008/0307139 | A1* | 12/2008 | Thomas | 710/244 |

OTHER PUBLICATIONS

"Provision." Chambers 21st Century Dictionary. London: Chambers Harrap, 2001. Credo Reference [online][retrieved on Jun. 22, 2009]. Retrieved from: <http://www.credoreference.com/entry/chambdict/provision>.*

"Define" Webster's Third New International Dictionary, Unabridged. Merriam-Webster, Incorporated, 1993. [online][retrieved on Jun. 22, 2009]. Retrieved from: <http://lionreference.chadwyck.com/searchFulltext.do?id=9012438&idType=offset&divLevel=2&queryId=../session/1245691006_18979&area=mwd&forward=refshelf&trail=refshelf>.*

"Stop." Webster's Third New International Dictionary, Unabridged. Merriam-Webster, Incorporated, 1993. [online][retrieved on Jun. 22, 2009]. Retrieved from: <http://lionreference.chadwyck.com/searchFulltext.do?id=34310590&idType=offset&divLevel=2&queryId=../session/1245700429_3927&area=mwd&forward=refshelf&trail=refshelf>.*

"Associate." Collins English Dictionary. London: Collins, 2000. Credo Reference [online][retrieved on Jan. 16, 2009]. Retrieved from: <http://www.xreferplus.com/entry/hcengdict/associate>.*

"For." Chambers 21st Century Dictionary. Chambers Harrap, 2001. Credo Reference [online][retrieved on Jan. 16, 2009]. Retrieved from: <http://www.xreferplus.com/entry/chambdict/for>.*

Birrell, Andrew D. An Introduction to Programming with Threads. Digital Equipment Corporation. [online] 1989. [retrieved on May 28, 2019]. Retrieved from the Internet: <URL: https://www.hpl.hp.com/techreports/Compaq-DEC/SRC-RR-35.pdf> (Year: 1989).*

* cited by examiner

THREAD-BASED SOFTWARE LICENSE MANAGEMENT

FIELD OF THE INVENTION

The present invention generally relates to computers and data processing and, more particularly, to implementation and enforcement of software licenses.

BACKGROUND OF THE INVENTION

Software licensing is an important component to a software product suite produced by a software development company. When the primary products from a company are software only, enforcement of licenses to execute the software is an important method of maintaining revenue from customers. Many software products today have some type of activation key or sequence that enables legitimate purchasers of the software to install and use the software.

With some software packages, once an authorization code or key has been entered, the software may be run on any computer. Some of these packages come with a software license agreement that states that the software package may only be executed on one computer. Multiple installations of the software are a violation of the software license agreement. One method of tracking the unauthorized usage is to register the product with the vendor, though this may not provide the information necessary to locate unlicensed copies. Likewise, a customer may purchase a site license, which does entitle them to install the software on multiple computers.

An alternate approach is to tie the software license for an application to a particular piece of hardware. This may be accomplished by associating a unique hardware identification, traditionally associated with the network hardware, with the software to limit the execution to a single system. In many cases, the configuration allows for multiple executions of the software package on the identified system. Typically this configuration is only limited by the amount of resources available to additional executions of the application. Based on resources alone, there will be a limit to the number of simultaneous executions on a particular system. Adding an additional execution of the application that competes for resources with other executions ultimately slows down all executions, thus reducing overall throughput. Larger computer systems with more resources will typically allow for additional simultaneous executions of the application.

Other license implementations allow for floating licenses where the number of executions of a software application are limited by the license. With a floating license, the executions of the application are no longer tied to a specific machine. Generally in these configurations, a license manager that controls the distribution of licenses is tied to and executes on one machine in a network. Other computers communicate with the license manager over the network to check out and return licenses associated with the software applications.

In addition to licensing the overall application, software development companies may also license individual functionalities or features of a particular software application. For example, an application may require a software license to execute on a system in a single processor mode. If a user of the application wanted to get faster throughput, he or she may pay the software development company additional money that would provide them with an additional license to be used in conjunction with the application license to enable parallel processing by the application. These additional feature licenses for software applications may provide for additional revenue streams for application producers.

Software licensing may also be a challenging area for software development organizations as it juxtaposes business desires to obtain maximum revenue from a product against a customer's desire to reduce software expense. While there are many ways to implement software licensing, it is generally decomposed into a measurement problem, collecting data to compare against the license key to know whether the license is in or out of compliance, a reporting problem, informing the application or user of a license compliance state, and a license enforcement problem, taking explicit action in "out of compliance" situations.

The measurement problems are generally well known in today's industry. Key data items may include items such as system serial number, number of physical processors in a system (traditionally measured in integer increments), number of logical processors in a system configured for a logically partitioned computing environment (which may be measured in fractional or whole units), and/or quantity of memory. These data values may dictate the granularity of licenses, which may be sold and potentially enforced. Logically partitioned environments provide a unique challenge to software developers who use the system identification for licensing. In the logically partitioned environment, each of the logical or virtual machines share the same physical hardware resources, potentially having the same license attributes such as system serial number and number of processors from a licensing standpoint. Because this configuration allows each machine to operate as an individual, stand-alone machine, multiple copies of a software application, intended to be licensed on a single machine, may now be executed simultaneously.

Likewise, problems with reporting are well understood by those of ordinary skill in the art. The problems relate to the best way to present the licensing information to a user of an application. In a typical situation, licensing should be invisible to the user of an application. Only when an occurrence of application or system function being out of compliance with a license should the user or other administrator be informed or have to take action. For example, a general design point for reporting may be based on messaging designed with subsequent actions potentially triggered by the messages. The message may be posted to a log file by the license manager when a license is out of compliance. Daemons, executing on the system, may be configured to monitor the log file and to send an e-mail or other indicator to a system operator when such a message is received. This may allow the administrator to take proactive action to correct the situation.

Another area for improvement in this space relates to a third area of license enforcement. Common actions taken today generally have a high impact when licenses are out of compliance and automatic enforcement is performed. Severe actions may include denial of service by preventing execution of the whole application or degradation of system performance such that all applications running on the system are negatively impacted. While these actions may seem reasonable in the cases of intentional license misuse, they are a significant inconvenience to a customer who has made an honest mistake. For example, a customer who has purchased a software license for four processors' worth of database access may be fine while running it on a logically partitioned system with four processors in their partition. But if the system administrator temporarily brings an additional two processors to this partition to fix a performance problem in a different application, he or she may be accidentally forcing the database license out of compliance. If this license has automatic enforcement of a severe nature, the database application may terminate against the wishes of the customer who thought they were in compliance with the license. Software vendors who allow for automatic enforcement of licenses may have to address the impact on customer satisfaction.

SUMMARY OF THE INVENTION

Embodiments of the present invention address these and other problems associated with the prior art by providing a method of managing a software license on a computer with the ability to better police license usage by a software developer and minimize situations where an application is inadvertently out of compliance with the license. The method associates a software license resource with an execution thread of a task or process and selectively dispatches the thread for execution based upon a license provision defined by the software license resource.

In some embodiments consistent with the invention, threads are dispatched after checking the availability of the software license resource. If the software license resource is available, the software license resource is acquired and the thread is sent for execution. If, however, the software license resource is unavailable, the thread is queued until the software license resource becomes available. Similarly, the thread is queued if a system resource required by the task becomes unavailable, temporarily stopping the execution of the thread. The thread returns the software license resource and is queued until the resource becomes available. When the system resource is again available, the availability of the software license resource is checked. If the license resource is available, the software license resource is again acquired and the thread continues to execute.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments of the present invention provide for software license enforcement at the task dispatcher level in the operating system or partition manager, rather than at much higher levels, such as program execution start, as with some conventional software license management systems. To provide system administrators with the ability to better police license usage by an end user and to minimize inadvertent situations where an application is out of compliance with a license, embodiments of the license manager may be implemented on a stand alone computer as part of the operating system, in a logically partitioned computing environment as part of the partition manager, or in a cluster of networked computers. In the latter, license information may be sent out over a network, with the license enforcement still occurring at the dispatcher level in the operation system or partition manager.

Figure 1:
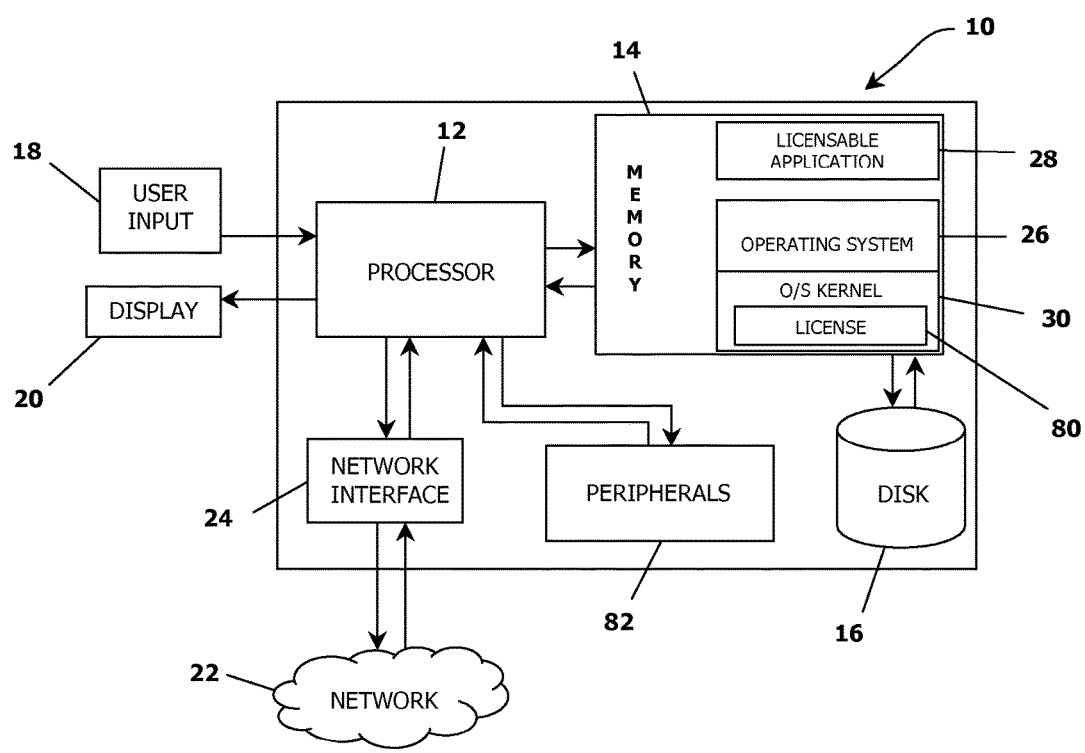
FIG. 1 is a block diagram of an exemplary hardware and software environment for a computer suitable for implementing software license management consistent with the invention.

Turning to the drawings, wherein like numbers denote like parts throughout the several views, FIG. 1 illustrates an exemplary hardware and software environment for an apparatus 10 suitable for implementing a license manager consistent with the invention. For the purposes of the invention, apparatus 10 may represent practically any computer, computer system, or programmable device e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16.

Computer 10 also typically receives a number of inputs and outputs for communicating information externally. For interface with a user or operator, computer 10 typically includes one or more user input devices 18 (e.g., a keyboard, a mouse, a trackball, a joystick, a touchpad, a keypad, a stylus, and/or a microphone, among others). Computer 10 may also include a display 20 (e.g., a CRT monitor, an LCD display panel, and/or a speaker, among others). The interface to computer 10 may also be through an external terminal connected directly or remotely to computer 10, or through another computer communicating with computer 10 via a network 22 through a network interface 24, a modem, or another type of communications device.

Computer 10 operates under the control of operating system 26 and kernel 30 and executes or otherwise relies upon various computer software applications, components, programs, objects, modules, data structures, etc. (e.g. licensable application 28). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network 22.

Figure 2:
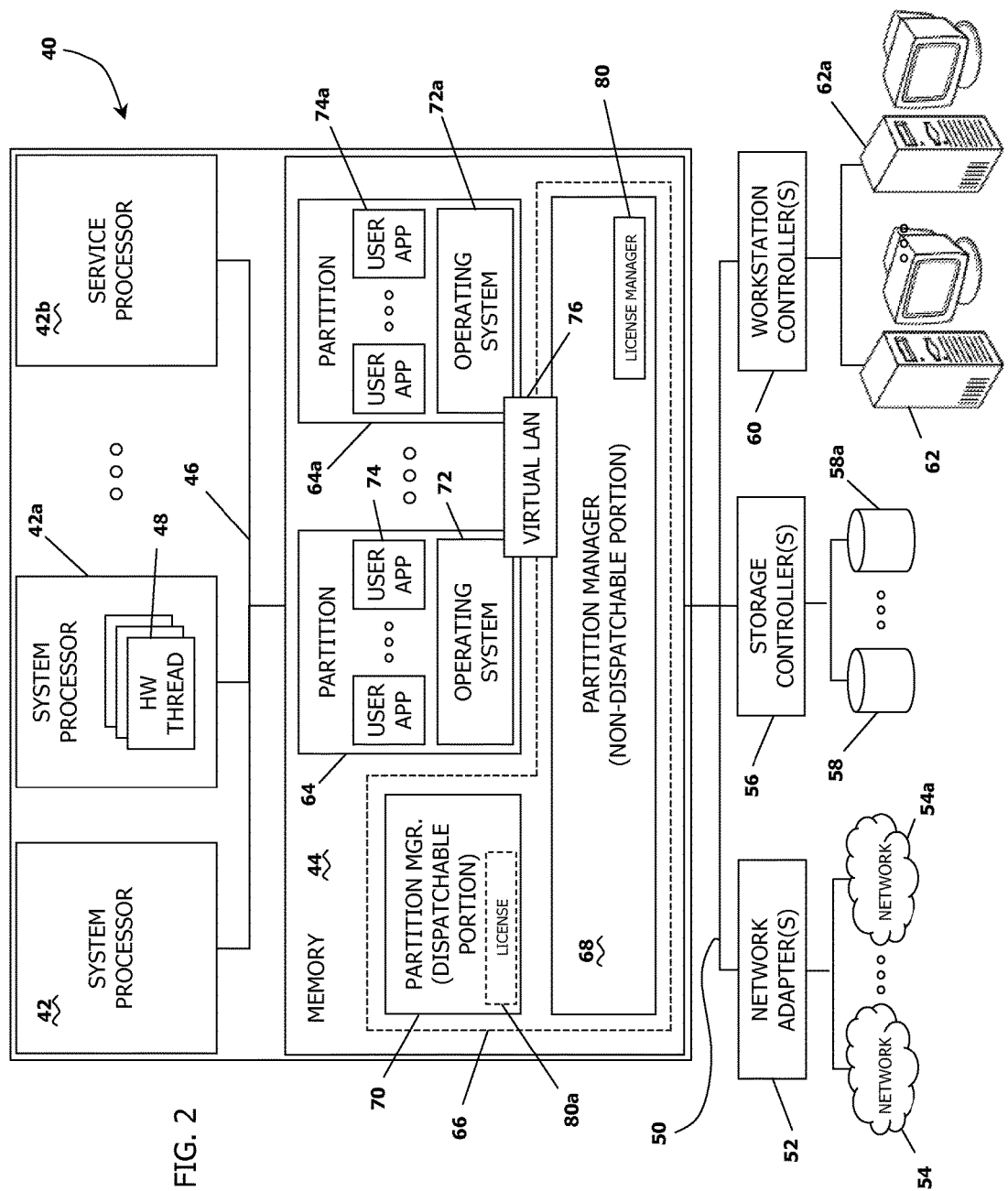
FIG. 2 is a block diagram of an exemplary hardware and software environment for a logically partitioned computer suitable for implementing software license management consistent with the invention.

Computer 10 may also operate as a logically partitioned computing environment. FIG. 2 illustrates the principal hardware components in a logically-partitioned computer 40 consistent with the invention. Computer 40 generically represents, for example, any of a number of multi-user computers such as a network server, a midrange computer, a mainframe computer, etc., e.g., an IBM eServer computer.

Computer 40 generally includes one or more processors 42 coupled to a memory 44 via a bus 46. Each processor 42 may be implemented as a single threaded processor, or as a multithreaded processor, such as with processor 42a, which is shown incorporating a plurality of hardware threads 48. For the most part, each hardware thread 48 in a multi-threaded processor 42a is treated like an independent processor by the software resident in the computer.

In addition, as is also illustrated in FIG. 2, one or more of processors 42 (e.g., processor 42b) may be implemented as a service processor, which is used to run specialized firmware code to manage system initial program loads (IPL's), and to monitor, diagnose and configure system hardware. Generally, computer 40 may include one or more service processors and multiple system processors, which are used to execute the operating systems and applications resident in the computer, although the invention is not limited to this particular implementation. In some implementations, a service processor may be coupled to the various other hardware components in the computer in manners other than through bus 46.

Memory 44 may include one or more levels of memory devices, e.g., a DRAM-based main storage, as well as one or more levels of data, instruction and/or combination caches, with certain caches either serving individual processors or multiple processors as is well known in the art. Furthermore, memory 44 is coupled to a number of types of external devices via a bus 50, e.g., one or more network adapters 52 (for interfacing the computer with network(s) 54), one or more storage controllers 56 (for interfacing the computer with one or more storage devices 58) and one or more workstation controllers 60 (for interfacing with one or more terminals or workstations 62 via a plurality of workstation adapters).

FIG. 2 also illustrates in greater detail the primary software components and resources utilized in implementing a logically partitioned computing environment on computer 40, including a plurality of logical partitions 64 managed by a partition manager or hypervisor 66. Any number of logical partitions may be supported as is well known in the art, and the number of logical partitions resident at any time in a computer may change dynamically as partitions are added or removed from the computer.

In the illustrated IBM eServer-based implementation, partition manager 66 is comprised of two layers of program code. The first, referred to herein as a non-dispatchable portion 68, is implemented within the firmware, or licensed internal code (LIC), of computer 40, which is utilized to provide a low level interface to various hardware components while isolating higher layers, e.g., the operating systems, from the details of the hardware access. The firmware may also communicate with a service processor such as service processor 42b. The non-dispatchable portion 68, which is also referred to herein as "PLIC", provides many of the low level partition management functions for computer 40, e.g., page table management, etc. The non-dispatchable portion 68 also has no concept of tasks, and is accessible principally via function calls from higher layers of software.

The second layer of program code in partition manager 66 is referred to herein as a dispatchable portion 70, or alternatively "PHYP". In contrast to non-dispatchable portion 68, which has no concept of tasks, is run with memory relocation off, and is accessible via supervisor function calls from higher layers of software, the dispatchable portion 70 has the concept of tasks (like any operating system), and is run with memory relocation on. The dispatchable portion typically executes in much the same manner as a partition, except that it is hidden from the user. The dispatchable portion generally manages higher level partition management operations such as creating and deleting partitions, concurrent hardware maintenance, allocating processors, memory and other hardware resources to various partitions 64, etc.

Each logical partition 64 is typically statically and/or dynamically allocated a portion of the available resources in computer 40. For example, each logical partition may be allocated one or more processors 42 and/or one or more hardware threads 48, as well as a portion of the available memory space. Logical partitions can share specific hardware resources such as processors, such that a given processor is utilized by more than one logical partition. In the alternative, hardware resources can be allocated to only one logical partition at a time.

Additional resources, e.g., mass storage, backup storage, user input, network connections, display devices, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time. In addition, some resources may be "virtual" in nature, e.g., virtual network adapters used in a virtual local area network.

Each logical partition 64 utilizes an operating system 72 that controls the primary operations of the logical partition in the same manner as the operating system of a non-partitioned computer. For example, each operating system 72 may be implemented using the OS/400 operating system available from International Business Machines Corporation.

Each logical partition 64 executes in a separate, or independent, memory space, and thus each logical partition acts much the same as an independent, non-partitioned computer from the perspective of each user application (licensable application-user app) 74 that executes in each such logical partition. As such, user applications typically do not require any special configuration for use in a partitioned environment.

Given the nature of logical partitions 64 as separate virtual computers, it may be desirable to support inter-partition communication to permit the logical partitions to communicate with one another as if the logical partitions were on separate physical machines. As such, in some implementations it may be desirable to support a virtual local area network (LAN) 76 in non-dispatchable portion 68 to permit logical partitions 64 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 70 that is separate from any partition 64, the functionality of the dispatchable portion may be incorporated into one or more logical partitions in the alternative.

In general, the routines executed to implement the embodiments of the invention, whether implemented on either computer 10 or computer 40 as part of an operating system, a partition manager, or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable medium used to actually carry out the distribution. Examples of computer readable medium include, but are not limited to, physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

A software licensing technique, according to an embodiment of the invention, treats software licenses as a system resource, similar to I/O functions, on computer systems such as computer systems 10 and 40 discussed above. Resource scheduling, sometimes referred as task scheduling, may be utilized in such a manner as to allow hard enforcement of software licenses, where desired, yet minimizing pervasive system impacts and allowing for reasonable, localized actions for an application, which may be out of compliance. For example, an application might be licensed to run on four processors but the system might have eight processors available to the operating system. In this environment, the scheduler and dispatcher would only ever allow four processors to concurrently execute threads of execution associated with the application. Any additional threads wishing to execute would have to wait until one of the other threads yields. This is a similar technique inherently applied to I/O resources, which are physically constrained: multiple applications can not communicate with the physical hardware at the same time. Thus, some threads wait until I/O of other threads completes.

Licensable applications executing on a computer typically create processes, sometimes referred to as tasks, during their execution. Processes may "own" resources allocated by the operating system including memory, file handles, sockets, device handles, and windows. Processes typically do not share address spaces or file resources with one another except through explicit methods such as inheriting file handles or shared memory segments, or mapping the same file in a shared way.

While processes are sometimes referred to and are similar to tasks, a person of ordinary skill in the art may view a task as an execution path through an address space having a sense of a real-time application, as distinguished from a process, which takes up space (memory) and execution time. For the purposes of the present invention, however, the terms "process" and "task" may be used interchangeably. Tasks and processes may further be divided into threads. A thread to a person of ordinary skill in the art is short for a thread of execution. Threads are typically a way for a program to split (or fork) itself into two or more simultaneously (or pseudo-simultaneously) executing parts. Threads and processes/tasks differ from one operating system to another, but in general, the way that a thread is created and shares its resources is different from that of a process or task.

Multiple threads can be executed in parallel on many computer systems. This multithreading generally occurs by time slicing (similar to time-division multiplexing), wherein a single processor switches between different threads, in which case the processing is not literally simultaneous, for the single processor is really doing only one thing at a time. This switching can happen so fast as to give the illusion of simultaneity to an end user. For instance, some personal computers today contain only one processor core, but allow for running multiple programs at once, such as typing in a document editor while listening to music in an audio playback program. Though the user experiences these things as simultaneous, in truth, the processor quickly switches back and forth between these separate processes. On a multiprocessor or multi-core system, now becoming more common, threading can be achieved via multiprocessing, wherein different threads and processes can run literally simultaneously on different processors or cores.

Many modern operating systems directly support both time-sliced and multiprocessor threading with a resource scheduler and generally implement threads in one of two ways: preemptive multithreading, or cooperative multithreading. In preemptive multithreading the operating system is allowed to determine when a context switch should occur, while cooperative multithreading relies on the threads themselves to relinquish control once they are at a stopping point. Though each implementation may have additional benefits for different hardware and software configurations, either thread implementation may be utilized with the embodiments of the present invention. The operating system kernel may also allow programmers to manipulate threads via the system call interface.

In the illustrated embodiments, software licenses are defined as "resources", similar to other types of resources that may be used in a computing environment, e.g., I/O or processor resources. One embodiment may utilize semaphores to represent each software license. As a process or task executes in the computing environment, a series of threads may be created during the execution. When a given thread is ready to be dispatched, it attempts to use the software license (semaphore). If the semaphore is available, the thread can execute. When the thread has to wait again, the software license semaphore is released. When the software license limit is exceeded, the thread may be re-queued for execution at a future time. Additionally, software license semaphores may be implemented in a hypervisor and used to share licenses among different partitions sharing the same software or may be shared throughout an enterprise among multiple servers, or in the kernel for systems without logical partitioning.

Semaphores are typically used for coordinating or synchronizing activities in which multiple processes compete for the same operating system resources. A semaphore is a value in a designated place in operating system (or kernel) storage that each thread can check and change. Depending on the value that is found, the thread can use the resource or will find that it is already in use and must wait for some period before trying again. Semaphores can be binary (0 or 1) or can have additional values. Typically, threads in an application using semaphores check the value stored and then, if using the resource, change the value to reflect this so that subsequent semaphore users will know to wait.

Figure 3:
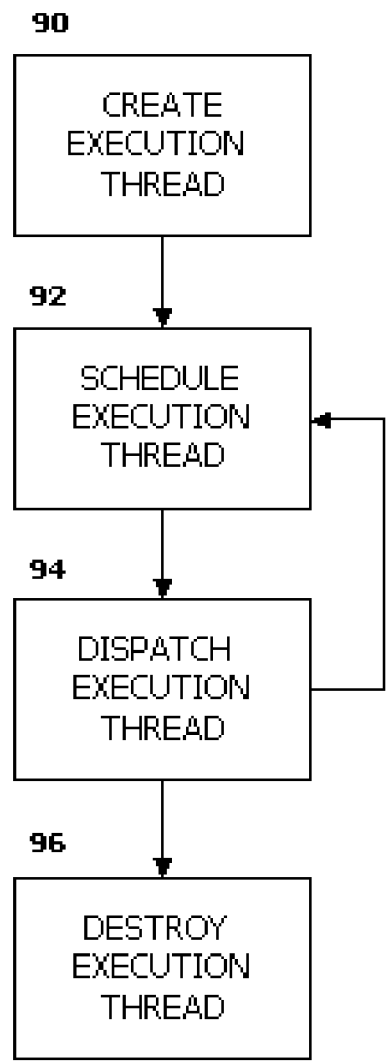
FIG. 3 is a flowchart illustrating a cycle of an execution thread.

FIGS. 3 through 7 illustrate a number of routines executed by a resource dispatcher to implement software license management in either of computer 10 or computer 40. A licensable application may be executing on either of computer 10 or computer 40. During the execution, the application may be represented by at least one process. While executing, the process(es) may create a series of threads of execution either serially, in parallel, or some combination of the both. The threads may then be scheduled and dispatched in accordance with the availability of system resources. FIG. 3 shows an exemplary series of steps for an execution thread created by an executing process or task. First the execution thread is created (block 90). Once created, the execution thread is scheduled for execution (block 92). The thread waits in a queue until the necessary resources are available, at which point the task is dispatched for execution (block 94). If during execution, resources required by the execution thread become unavailable, the task may be rescheduled to await further execution when the resource becomes available. After the execution thread has completed, the thread is destroyed (block 96), and the process or task may then create new execution threads.

Figure 4:
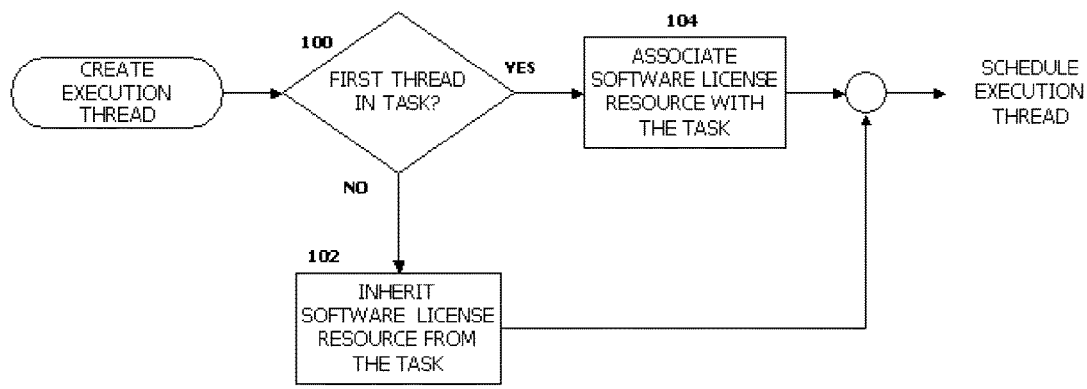
FIG. 4 is a flowchart providing additional detail for the creation step of the flowchart in FIG. 3.

FIGS. 4 through 7 provide additional detail to the steps identified above for an execution thread. In addition, the flowcharts in theses figures illustrate how a software license resource may be associated with the execution threads. Beginning now with FIG. 4, illustrating the creation of an execution thread, an executing task creates an execution thread, and a check is made to see if the thread is the first thread in the task in block 100. Knowing if the execution thread is the first thread in a task may be important when determining software license usage. For example, if the execution thread is not the first thread in the task (no branch of decision block 100), then the execution thread may optionally inherit software license resource information from the previous execution thread in block 102. Advantages for optionally inheriting the licenses may provide for license continuity for a particular executing task and may reduce the number of license calls necessary for the execution of that task. If, however, this is the first execution task in the thread, or this is the first task to require a specific license (yes branch of decision block 100), then the software license resource is associated with the execution task in block 104. Now that the execution thread has been created, the operation system or hypervisor may schedule the thread for execution as seen in the flowchart in FIG. 5.

The scheduler must now look for both the availability of not only system resources required by the execution thread, but also any software license resources that are required by the execution thread in order to execute. If one or the other or both the system and license resources are unavailable (no branches of decision blocks 110 and 112), the execution thread is queued in block 114. System resources, such as I/O, may be unavailable as the hardware associated with the I/O may be in use by another thread/task/process. Software license resources may be unavailable for a number of reasons. The software license may be "seat" limited. In other words, a limited number of licenses or "seats" limit the number of executions of a particular program, program feature, or function. The thread may be queued if all of the appropriate license seats are in use by other execution threads. The license may be date limited, expiring on a certain date, and the execution thread may be trying to access the license resource after the expiration date. A third possibility is that the execution thread is attempting to access a licensable feature for which there is no current license available. Additionally, the thread may queued for any other possible licensing restrictions, such as a restriction to the time of the day, or a restriction to weekend or weekday execution, etc.

Once the system and license resources become available and the execution thread is ready to execute (yes branch of decision block 116), the execution thread is dequeued in block 118, and as long as the resources remain available (yes branches of decision blocks 110 and 112), the software license resource is acquired in block 120.

Figure 6:
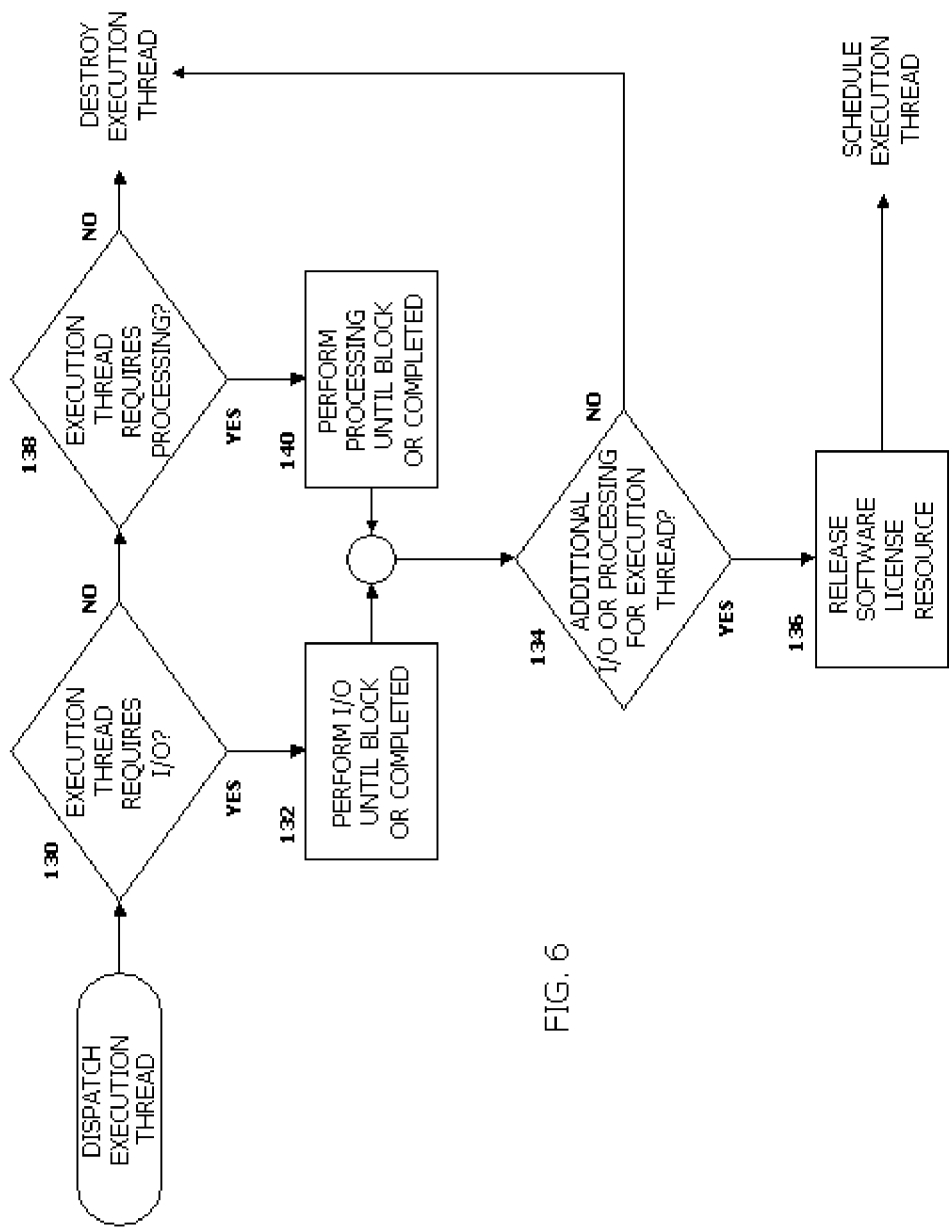
FIG. 6 is a flowchart providing additional detail for the dispatching step of the flowchart in FIG. 3.

After acquiring the license resource, the execution thread is ready for execution as shown in FIG. 6. Once the execution thread has been dispatched for execution, a check is made to determine if the execution thread requires I/O in block 130. If I/O is required (yes branch of decision block 130), then the I/O is performed until the I/O resource becomes unavailable or the I/O is completed in block 132. If additional I/O or execution is required (yes branch of decision block 134), then the software license resource is released in block 136 and the execution thread is sent back to the scheduler. If the execution thread does not require I/O (no branch of decision block 130), but does require processing (yes branch of decision block 138), processing of the execution thread occurs in block 140 until either the processing is complete or a necessary resource becomes unavailable during processing. Similar to above, if additional I/O or execution is required (yes branch of decision block 134) then the software license resource is released and the execution thread is returned to the scheduler. If all of the I/O and processing for the execution thread has been completed (no branch of decision block 134 or 138), then the execution thread is sent to be destroyed.

Figure 7:
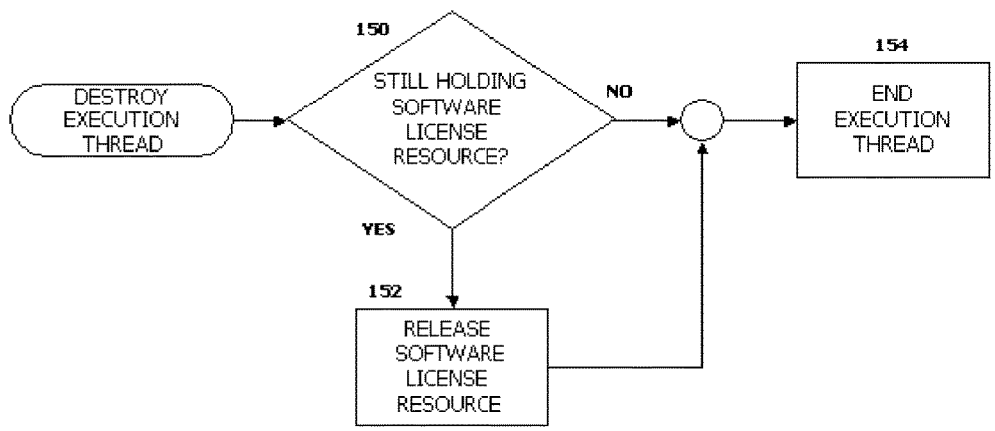
FIG. 7 is a flowchart providing additional detail for the destroying step of the flowchart in FIG. 3.
Figure 5:
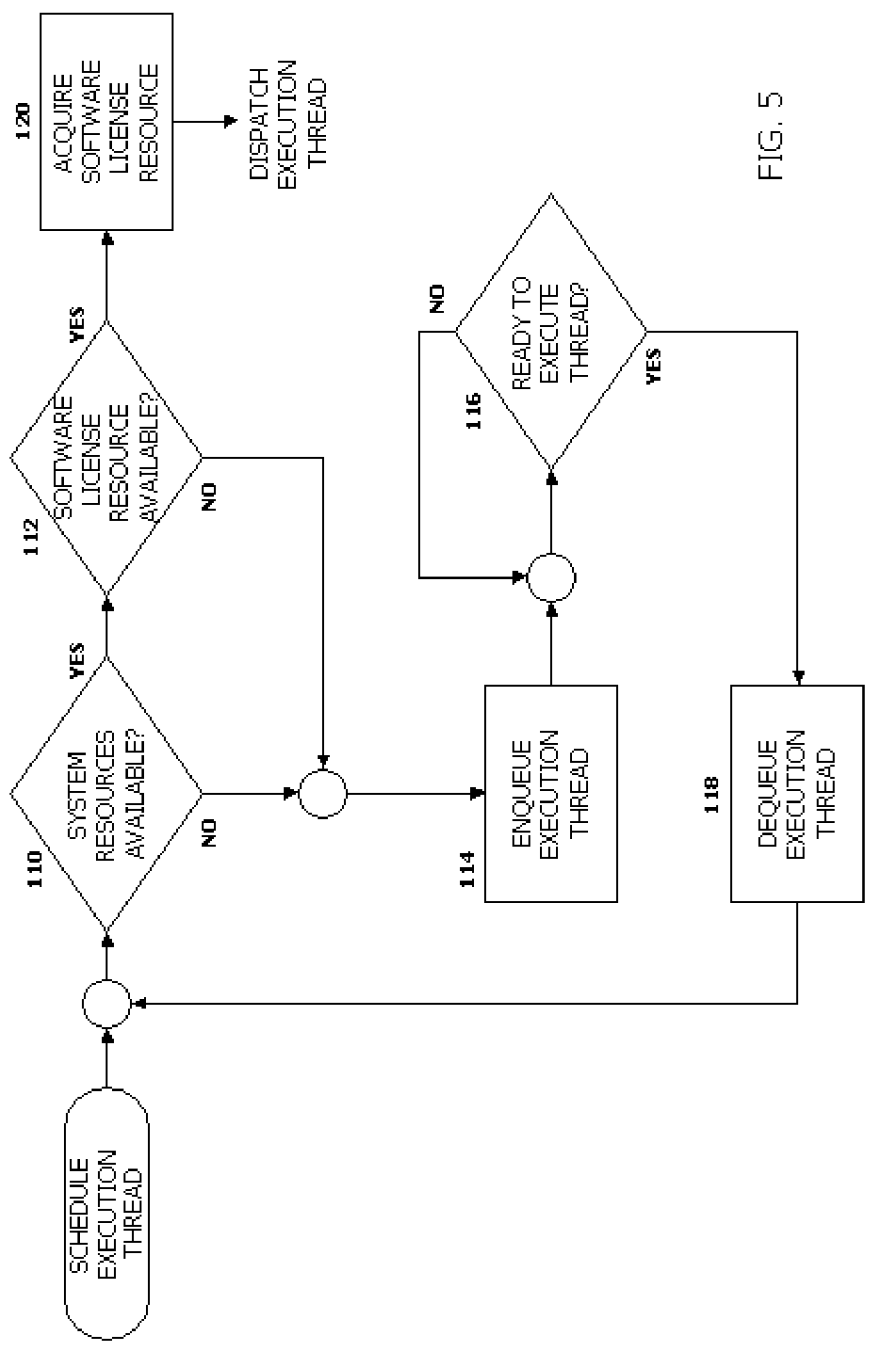
FIG. 5 is a flowchart providing additional detail for the scheduling step of the flowchart in FIG. 3.

Prior to the destruction of the completed execution thread, as shown in FIG. 7, a check is made to determine if the execution thread is still holding a license resource in block 150. If the execution thread is still holding a license resource (yes branch of decision block 150), then the license is released in block 152 and the execution thread is ended in block 154.

As stated above, the semaphore implementation of license enforcement may be implemented in the operating system kernel as shown for the stand-alone computer 10 in FIG. 1, or in the partition manager as shown for the logically partitioned computing environment in FIG. 2. In some embodiments of the logically partitioned environment, the license manager may be implemented in the nondispatchable portion of the partition manager as indicated by the reference numeral 80 in FIG. 2. In other embodiments, the license manager may be implemented at a higher level in the dispatchable portion of the partition manager as indicated by the reference numeral 80*a* in FIG. 2. Other embodiments of the license manager in the logically partitioned computer may be in the kernel of the operating system for an individual logically partitioned computer, much like the stand-alone computer in FIG. 1.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art, such as applying this technique to existing applications of temporary activation and software metering. Temporary activations may automatically adjust the limits on semaphores and metering may monitor semaphore usage over time. The invention in its broader aspects is therefore not limited to the specific details, representative apparatus and method, and illustrative examples shown and described. Accordingly, departures may be made from such details without departing from the spirit or scope of applicant's general inventive concept.

What is claimed is:

1. A method of executing a plurality of execution threads in a computer, the method comprising:
    scheduling and dispatching the plurality of execution threads to one or more hardware-implemented processors of the computer for execution thereby using a resource scheduler resident in the computer;
    representing a software license for an application using one or more stored software license resources that enforce the software license by selectively inhibiting execution of one or more execution threads of the application; and
    scheduling a first execution thread of the application for execution by a first hardware-implemented processor among the one or more hardware-implemented processors of the computer with the a resource scheduler, wherein scheduling the first execution thread for execution includes:
        accessing a software license resource among the one or more stored software license resources representing the software license to determine availability of the software license resource; and
        enforcing the software license by selectively dispatching the first execution thread to the first hardware-implemented processor for execution based upon a determined availability of the software license resource, wherein the resource scheduler is configured to inhibit execution of the first execution thread in response to a determined unavailability of the software license resource.

2. The method of claim 1 wherein the software license resource is represented by a semaphore and wherein scheduling the first execution thread comprises:
    accessing the semaphore to determine the availability of the software license resource; and
    in response to the determined availability of the software license resource, acquiring the semaphore and executing the thread.

3. The method of claim 2 further comprising:
    in response to the determined unavailability of the software license resource, queuing the first execution thread until the software license resource becomes available.

4. The method of claim 2 further comprising, in response to an unavailable system resource additionally required by the first execution thread:
    stopping the execution of the first execution thread;
    returning the software license resource by releasing the semaphore; and
    queuing the first execution thread until the system resource becomes available.

5. The method of claim 4 further comprising, in response to the system resource becoming available:
    checking the availability of the software license resource by accessing the semaphore;
    acquiring the semaphore; and
    executing the first execution thread.

6. The method of claim 2 further comprising, in response to a pending I/O operation to a device from the thread:
    stopping the execution of the first execution thread;
    returning the software license resource by releasing the semaphore; and
    queuing the first execution thread until the pending I/O operation is complete.

7. The method of claim 2 wherein determining the availability of the software license resource includes making a first license call, the method further comprising:
    creating a second execution thread for the application;
    determining that the second execution thread is not the first thread in the application; and
    in response to determining that the second execution thread is not the first thread in the application, inheriting software license resource information from the first execution thread to avoid making a second license call for the second execution thread.

8. The method of claim 1 wherein determining the availability of the software license resource includes determining one or more of compliance with a seat limitation, compliance with a date limitation, compliance with a feature limitation, and compliance with a time limitation defined by the software license resource.

9. The method of claim 1 wherein the software license resource is represented by a semaphore among a plurality of semaphores, the plurality of semaphores representing a plurality of software license resources for the software license, wherein the computer is among a plurality of computers, and wherein the plurality of semaphores are shared by the plurality of computers to enforce the software license across the plurality of computers using respective resource schedulers resident on the plurality of computers.

10. The method of claim 1 wherein the software license resource is implemented in an operating system kernel.

11. The method of claim 1 wherein the computer is a logically partitioned computer and wherein the software license resource is implemented in a partition manager.

12. An apparatus, comprising:
    at least one hardware-implemented processor;
    a memory storing one or more software license resources that enforce a software license for an application by selectively inhibiting execution of one or more execution threads of the application; and
    a resource scheduler that upon execution by the at least one hardware-implemented processor schedules and dispatches a plurality of execution threads to the at least one hardware-implemented processor for execution thereby, wherein the resource scheduler schedules execution of a first execution thread of the application on a first hardware-implemented processor among the at least one hardware-implemented processor by:

accessing a software license resource among the one or more stored software license resources representing the software license to determine availability of the software license resource; and enforcing the software license by selectively dispatching the first execution thread to the first hardware-implemented processor based upon a determined availability of the software license resource, wherein the resource scheduler is configured to inhibit execution of the first execution thread in response to a determined unavailability of the software license resource.

13. The apparatus of claim 12 wherein the software license resource is represented by a semaphore and wherein the resource scheduler is further configured to access the semaphore to determine the availability of the software license resource, and in response to the determined availability of the software license resource, acquire the semaphore and execute the thread.

14. The apparatus of claim 13 wherein the resource scheduler is further configured to queue the first execution thread in response to the determined unavailability of the software license resource until the software license resource becomes available.

15. The apparatus of claim 13 wherein the resource scheduler is further configured to stop the execution of the first execution thread in response to an unavailable system resource additionally required by the first execution thread, return the software license resource by releasing the semaphore, and queue the first execution thread until the system resource becomes available.

16. The apparatus of claim 15 wherein the resource scheduler is further configured to repeat a check of the availability of the software license resource after queuing the first execution thread, and in response thereto acquire the semaphore and execute the first execution thread.

17. The apparatus of claim 13 wherein the resource scheduler is further configured to stop the execution of the first execution thread in response to a pending I/O operation to a device from the first execution thread, return the software license resource by releasing the semaphore, and queue the first execution thread until the pending I/O operation is complete.

18. The apparatus of claim 13 wherein the resource scheduler is configured to determine the availability of the software license resource by making a first license call, and wherein the resource scheduler is further configured to:
create a second execution thread for the application;
determine that the second execution thread is not the first thread in the application; and
in response to determining that the second execution thread is not the first thread in the application, inherit software license resource information from the first execution thread to avoid making a second license call for the second execution thread.

19. The apparatus of claim 12 wherein the apparatus is a single user computer and the software license resource is implemented in an operating system kernel.

20. The apparatus of claim 12 wherein the resource scheduler is configured to determine the availability of the software license resource by determining one or more of compliance with a seat limitation, compliance with a date limitation, compliance with a feature limitation, and compliance with a time limitation defined by the software license resource.

21. The apparatus of claim 12 wherein the apparatus is a logically partitioned computer and wherein the software license resource is implemented in a partition manager.

22. The apparatus of claim 12 wherein the software license resource is represented by a semaphore among a plurality of semaphores, the plurality of semaphores representing a plurality of software license resources for the software license, wherein the apparatus comprises a plurality of computers, and wherein the plurality of semaphores are shared by the plurality of computers to enforce the software license across the plurality of computers using respective resource schedulers resident on the plurality of computers.

23. A program product, comprising:
a non-transitory computer recordable type medium; and
program code resident on the non-transitory computer recordable type medium, the program code including a resource scheduler configured to access one or more stored software license resources that enforce a software license for an application by selectively inhibiting execution of one or more execution threads of the application, the resource scheduler configured to, upon execution by at least one hardware-implemented processor, schedule and dispatch a plurality of execution threads to the at least one hardware-implemented processor for execution thereby, wherein the resource scheduler schedules execution of a first execution thread of the application on a first hardware-implemented processor among the at least one hardware-implemented processor by:
accessing a software license resource among the one or more stored software license resources representing the software license to determine availability of the software license resource; and
enforcing the software license by selectively dispatching the first execution thread to the first hardware-implemented processor based upon a determined availability of the software license resource, wherein the resource scheduler is configured to inhibit execution of the first execution thread in response to a determined unavailability of the software license resource.

24. The method of claim 1, further comprising:
scheduling the first execution thread for execution at a future time if the software license resource is currently unavailable.

25. The method of claim 1, wherein the software license resource is a shared system resource.

26. The method of claim 25, wherein the selective dispatching is performed by a hypervisor.

27. An apparatus, comprising:
computer hardware, the computer hardware including at least one memory and at least one processor coupled to the at least one memory;
a plurality of processes executing on the computer hardware, each process including at least one execution thread, the plurality of processes including a first process for an application subject to a software license, the at least one execution thread of the first process including a first execution thread;
a system resource including a processor resource or an input/output (I/O) resource and stored in the computer hardware;
a software license resource representing the software license and stored in the computer hardware, the software license resource defining a license provision for the software license and enforcing the software license by selectively inhibiting execution of one or more execution threads of the application, and the software license resource represented by a semaphore; and resource scheduling and dispatching program code resident in and executed by the computer hardware to schedule and dispatch execution threads for execution by the computer hardware, wherein the resource scheduling and dispatching program code is configured to enforce the software license against the first thread by:

checking availability of the software license resource by determining if the semaphore is available;

acquiring the software license resource if the semaphore is available;

checking availability of the system resource to determine if the system resource is available;

dispatching the first thread if the semaphore is available and the system resource is available;

if the semaphore is unavailable or the system resource is unavailable, queuing the first thread until the semaphore is available and the system resource is available;

executing the first thread in response to dispatching the first thread; and releasing the semaphore and destroying the first thread after execution of the first thread is complete.

* * * * *